United States Patent
Zelinski

(12) 
(10) Patent No.: US 7,013,565 B1
(45) Date of Patent: Mar. 21, 2006

(54) REMOVABLE COLLECTOR FOR LIQUID COOLED EXHAUST

(76) Inventor: Joseph R. Zelinski, 312 First St., Neenah, WI (US) 54956

( * ) Notice: Subject to any disclaimer, the term of this patent is extended or adjusted under 35 U.S.C. 154(b) by 313 days.

(21) Appl. No.: 10/644,691

(22) Filed: Aug. 20, 2003

(51) Int. Cl.
*B21D 51/16* (2006.01)

(52) U.S. Cl. .............................. 29/890.08; 29/890.038; 29/890.043; 60/321

(58) Field of Classification Search ............. 29/890.08, 29/890.038, 890.043, 525.11; 60/320, 321
See application file for complete search history.

(56) References Cited

U.S. PATENT DOCUMENTS

| | | | |
|---|---|---|---|
| 3,206,836 A * | 9/1965 | Schlussler | 29/890.08 |
| 3,470,690 A * | 10/1969 | Thompson | 60/303 |
| 5,148,675 A * | 9/1992 | Inman | 60/321 |
| 6,035,633 A | 3/2000 | Woods | 60/310 |
| 6,038,855 A * | 3/2000 | Markstrom et al. | 60/323 |
| 6,205,778 B1 * | 3/2001 | Akaba et al. | 60/323 |
| 6,918,246 B1 * | 7/2005 | Fukumoto et al. | 60/323 |
| 2002/0017097 A1 * | 2/2002 | Maus | 60/324 |
| 2003/0131594 A1 * | 7/2003 | Kawamizu | 60/299 |

* cited by examiner

*Primary Examiner*—Eric Compton
*Assistant Examiner*—Sarang Afzali
(74) *Attorney, Agent, or Firm*—Donald J. Ersler

(57) ABSTRACT

A removable collector for liquid cooled exhaust includes a retention member, a coolant transfer plate and a collector housing. The retention member fits between at least two exhaust jacket pipes and is attached thereto. Holes are formed through the coolant transfer plate to receive the at least two exhaust jacket pipes and exhaust pipes. The coolant transfer plate is secured to the retention member with fasteners. At least one coolant opening is formed through each exhaust jacket pipe at substantially an end thereof, adjacent a coolant passage cavity in the coolant transfer plate. The collector housing is attached to the coolant transfer plate. Coolant flows between the exhaust pipes and exhaust jacket pipes; through the coolant transfer plate; and through the collector housing. The removable collector for liquid cooled exhaust may be removed from the exhaust pipes by removing the fasteners. The exhaust pipes may be retained in a line.

28 Claims, 14 Drawing Sheets

REMOVABLE COLLECTOR FOR LIQUID COOLED EXHAUST

BACKGROUND OF THE INVENTION

1. Field of the Invention

The present invention relates generally to exhaust systems and more specially to a removable collector for liquid cooled exhaust, which allows a collector to be removed from an end of a set of exhaust pipes without complicated disassembly.

2. Discussion of the Prior Art

It appears, the only prior art that exist for an exhaust collector is a weld-on design. An outer star is welded to an end of a set of exhaust jacket pipes and then an inner star is welded to an end of a set of exhaust pipes. Next, an inner collector housing is welded to the inner star and then an outer collector housing is welded to the outer star. Finally, an end of the outer collector housing is welded to a perimeter of the inner collector housing. Many of the welding operations are difficult and time consuming to perform. A major drawback to the welded exhaust collector is failure due to stress corrosion cracking. The first and second stars tend to fail due stress corrosion cracking from a combination of heat, residual tensile stresses, vibration and salt water. Sometimes the header (set of exhaust pipes with exhaust jacket pipe) can be repaired, but most of the time the header cannot be repaired.

Accordingly, there is a clearly felt need in the art for a removable collector for liquid cooled exhaust, which may be removed from a header without cutting; is less prone to stress corrosion cracking; and may be more easily repaired, if a failure does occur.

SUMMARY OF THE INVENTION

The present invention provides a removable collector for liquid cooled exhaust, which is less prone to stress corrosion cracking than that of the prior art. The removable collector for liquid cooled exhaust (removable collector) includes a retention member, a coolant transfer plate and a collector housing. The retention member fits between at least two exhaust jacket pipes and is attached thereto. At least two fastener openings are formed through the retention member to receive at least two fasteners. The coolant transfer plate includes a fastener plate and a coolant passage plate. At least two jacket holes are formed through the fastener plate, which are each sized to receive a single exhaust jacket pipe. At least two tapped holes are preferably formed in the fastener plate to receive the at least two fasteners.

At least two pipe holes are formed through the coolant passage plate, which are each sized to receive a single exhaust pipe. At least one coolant passage opening is formed through the coolant passage plate at substantially a perimeter thereof. A coolant passage cavity is formed on one side of the coolant passage plate. The coolant passage plate is attached to the fastener plate on a perimeter thereof, with the coolant passage cavity adjacent the fastener plate.

An end of each exhaust jacket pipe is preferably rolled over such that the opening is sized to receive an exhaust pipe, but other methods of sealing each exhaust jacket pipe to a single exhaust pipe may also be used. At least one coolant opening is formed through each exhaust jacket pipe at substantially an end thereof. The coolant transfer plate is slipped over the exhaust jacket pipe, until thereof contacts the retention member. The retention member is attached to the at least two exhaust jacket pipes, such that the coolant passage cavity is adjacent each coolant opening. The collector housing includes an inner collector housing, an outer collector housing, a clamping flange and a coolant outlet nipple. One end of the inner collector housing is attached to the coolant transfer plate. The inner collector housing could also be a tail pipe. The clamping flange is attached to one end of the outer collector housing. The other end of the outer collector housing is attached to the coolant transfer plate. The clamping flange is attached to substantially the other end of the inner collector housing. A coolant hole is formed through the outer collector housing and the coolant outlet nipple is attached to the outer collector housing, adjacent the coolant hole.

Coolant flows between each exhaust pipe and exhaust jacket pipe and exits through the coolant openings into the coolant passage cavity. The coolant in the coolant passage cavity flows through the at least one coolant passage opening into an area between the inner and outer collector housings and out through the coolant outlet nipple.

A second embodiment of a removable collector retains the exhaust pipes in a line. The second embodiment of the removable collector includes a retention member, a coolant transfer plate and a collector housing. The retention member is attached to at least two exhaust jacket pipes. At least two fastener openings are formed through the retention member to receive at least two fasteners. The coolant transfer plate includes a fastener plate, a spacer and a coolant passage plate. At least two jacket holes are formed through the fastener plate, which are each sized to receive a single exhaust jacket pipe. At least two tapped holes are preferably formed in the fastener plate to receive the at least two fasteners.

At least two pipe holes are formed through the coolant passage plate, which are each sized to receive a single exhaust pipe. At least one coolant passage opening is formed through the coolant passage plate at substantially a perimeter thereof. The spacer is retained between the fastener plate and the coolant passage plate. The perimeters of the fastener plate, the spacer and the coolant passage plate are attached to each other with any suitable process, such as welding.

An end of each exhaust jacket pipe is preferably rolled over such that the opening is sized to receive an exhaust pipe, but other methods of sealing each exhaust jacket pipe to a single exhaust pipe may also be used. At least one coolant opening is formed through each exhaust jacket pipe at substantially an end thereof. The coolant transfer plate is slipped over the at least two exhaust jacket pipes, until it contacts the retention member. The retention member is attached to the at least two exhaust jacket pipes, such that the spacer is adjacent each coolant opening.

The collector housing includes an inner collector housing, an outer collector housing, a clamping flange and a coolant outlet nipple. One edge of the inner collector housing is attached to the coolant transfer plate. The clamping flange is attached to one end of the outer collector housing. One edge of the outer collector housing is also attached to the coolant transfer plate. The clamping flange is attached to substantially the one end of the inner collector housing. A coolant hole is formed through the outer collector housing and the coolant outlet nipple is attached to the outer collector housing, adjacent the coolant hole.

Coolant flows between each exhaust pipe and exhaust jacket pipe and exits through the coolant openings into the inner perimeter of the spacer. The coolant in the inner perimeter of the spacer flows through the at least one coolant passage opening into an area between the inner and outer collector housings and out through the coolant outlet nipple.

Accordingly, it is an object of the present invention to provide a removable collector for liquid cooled exhaust, which may be removed from a header without cutting.

It is a further object of the present invention to provide provide a removable collector for liquid cooled exhaust, which is less prone to failure.

Finally, it is another object of the present invention to provide a removable collector for liquid cooled exhaust, which may be more easily repaired, if a failure does occur.

These and additional objects, advantages, features and benefits of the present invention will become apparent from the following specification.

DETAILED DESCRIPTION OF THE PREFERRED EMBODIMENTS

Figure 1:
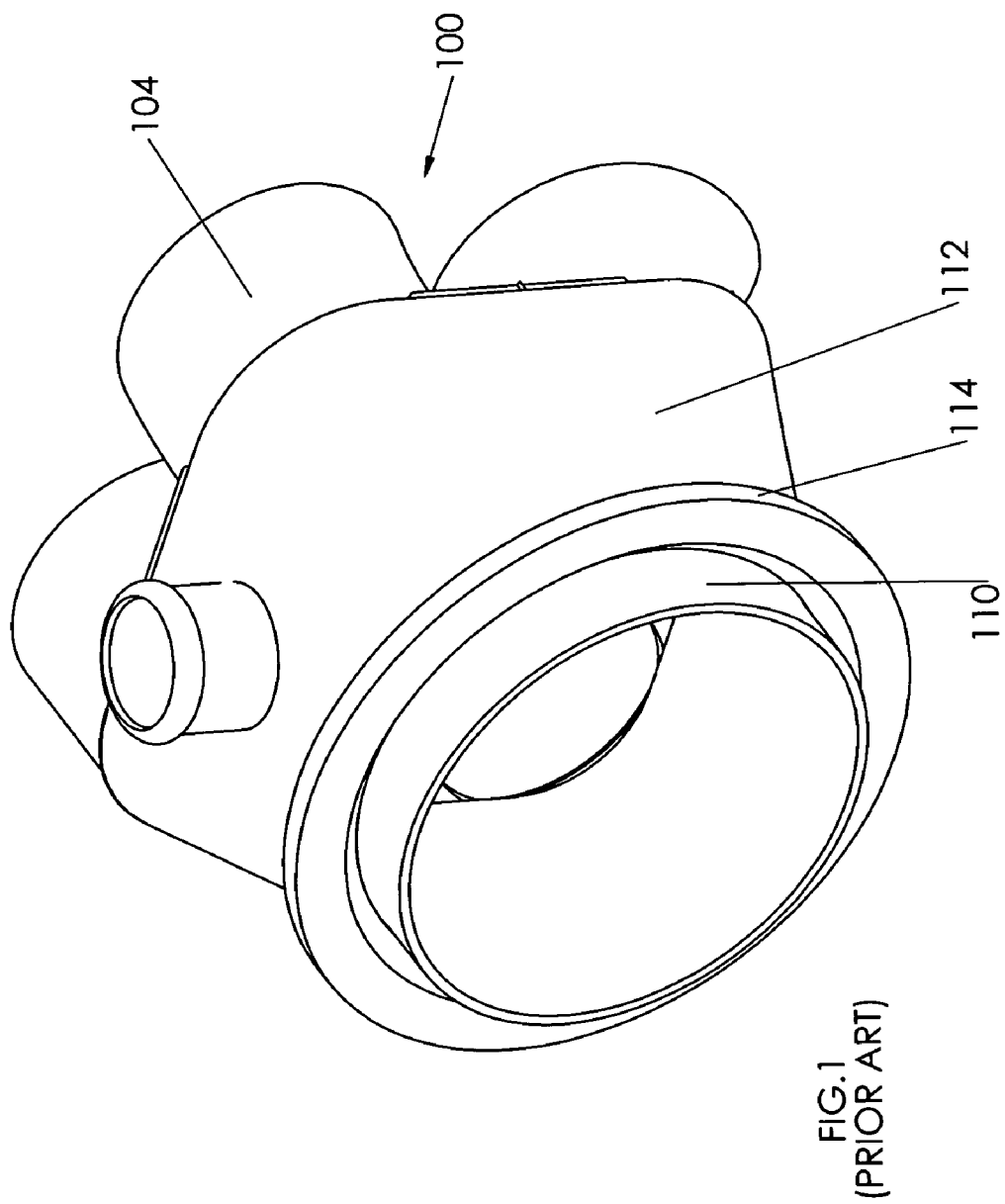
FIG. 1 is a perspective view of a prior art collector.
Figure 2:
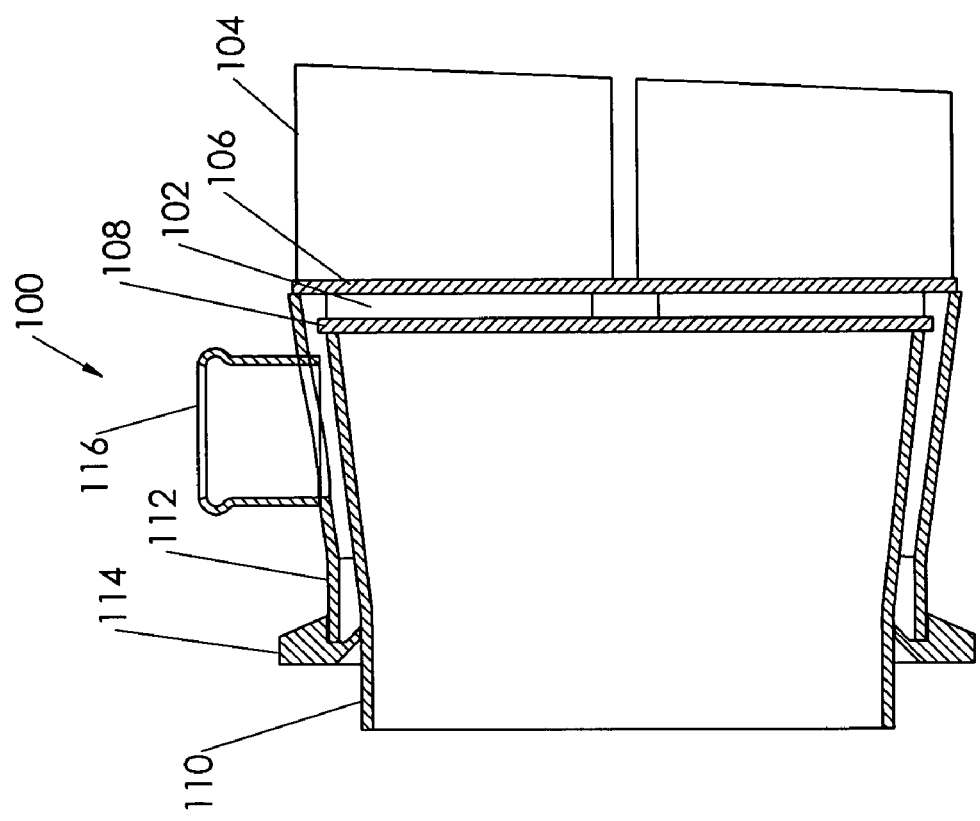
FIG. 2 is a cross sectional view of a prior art collector.

With reference now to the drawings, and particularly to FIG. 1, there is shown a perspective view of a prior art collector 100. With reference to FIG. 2, the prior art collector 100 includes at least two exhaust pipes 102, at least two exhaust jacket pipes 104, an outer flange 106, an inner flange 108, an inner collector housing 110, an outer collector housing 112 and a clamping flange 114. The outer flange 106 is welded to an end of the at least two exhaust jacket pipes 104 and the inner flange 108 is welded to an end of the at least two exhaust pipes 102. Next, the inner collector housing 110 is welded to the inner flange 108 and the outer collector housing 112 is welded to the outer flange 106. Finally, the clamping flange 114 is welded to a perimeter of the inner collector housing 110 and to an end of the outer collector housing 112.

Figure 2A:
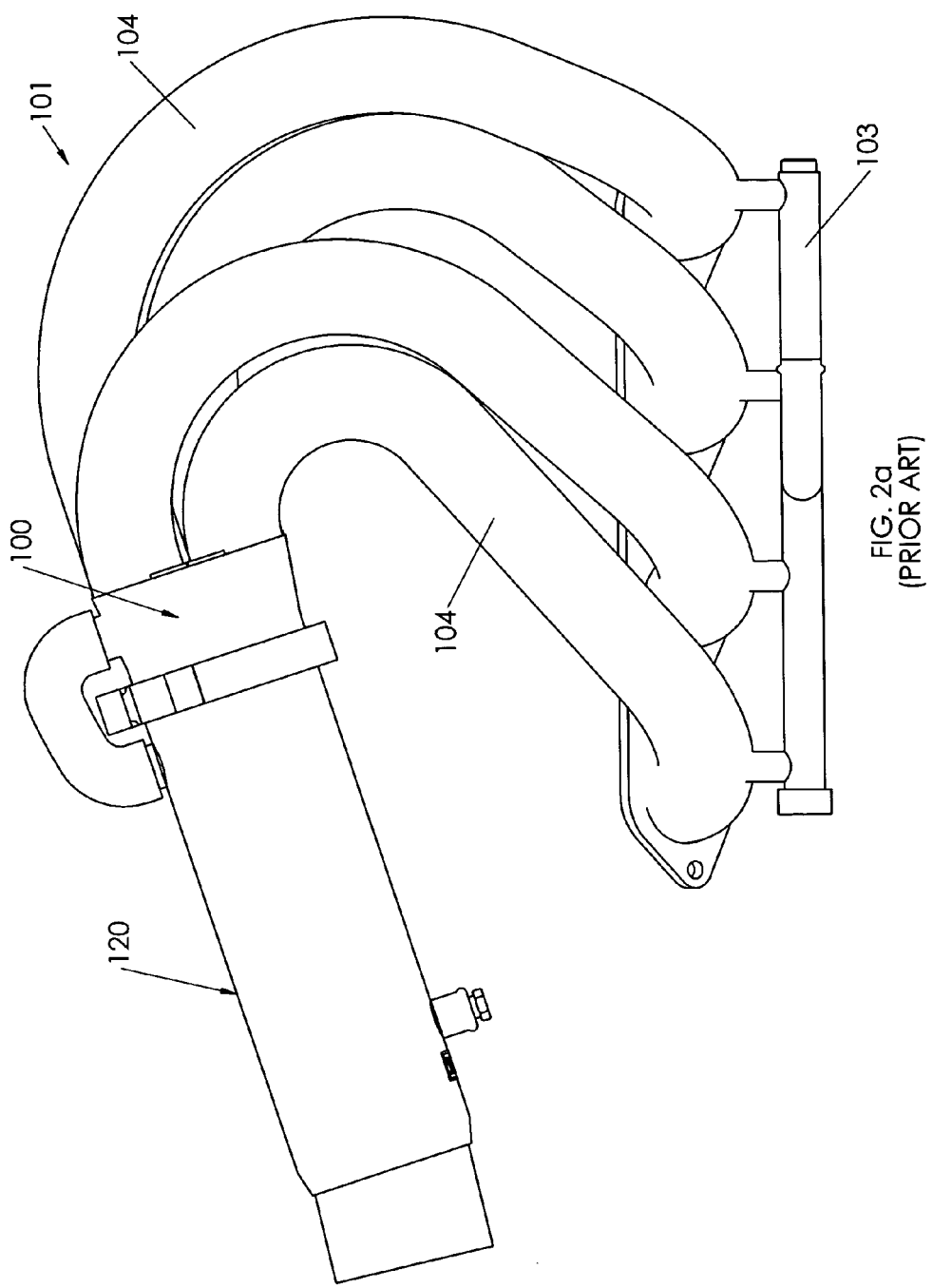
FIG. 2a is a side view of a prior art collector attached to a header.

Coolant flows between the at least two exhaust pipes 102 and the exhaust jacket pipes 104 into the area between the inner and outer collector housings and through an output nipple 116. The inner and outer flanges tend to fail, due to stress corrosion cracking from a combination of heat, residual tensile stresses, vibration and salt water. With reference to FIG. 2a, the prior art collector 100 is attached to an end of a header 101. The header 101 includes the at least two exhaust jacket pipes 104 and the at least two exhaust pipes 102. Coolant flows into the at least two exhaust jacket pipes 104 through a coolant lead pipe 103. When a failure occurs, sometimes the header 101 can be repaired, but usually the header 101 cannot be repaired, because the cost is prohibitive.

Figure 3:
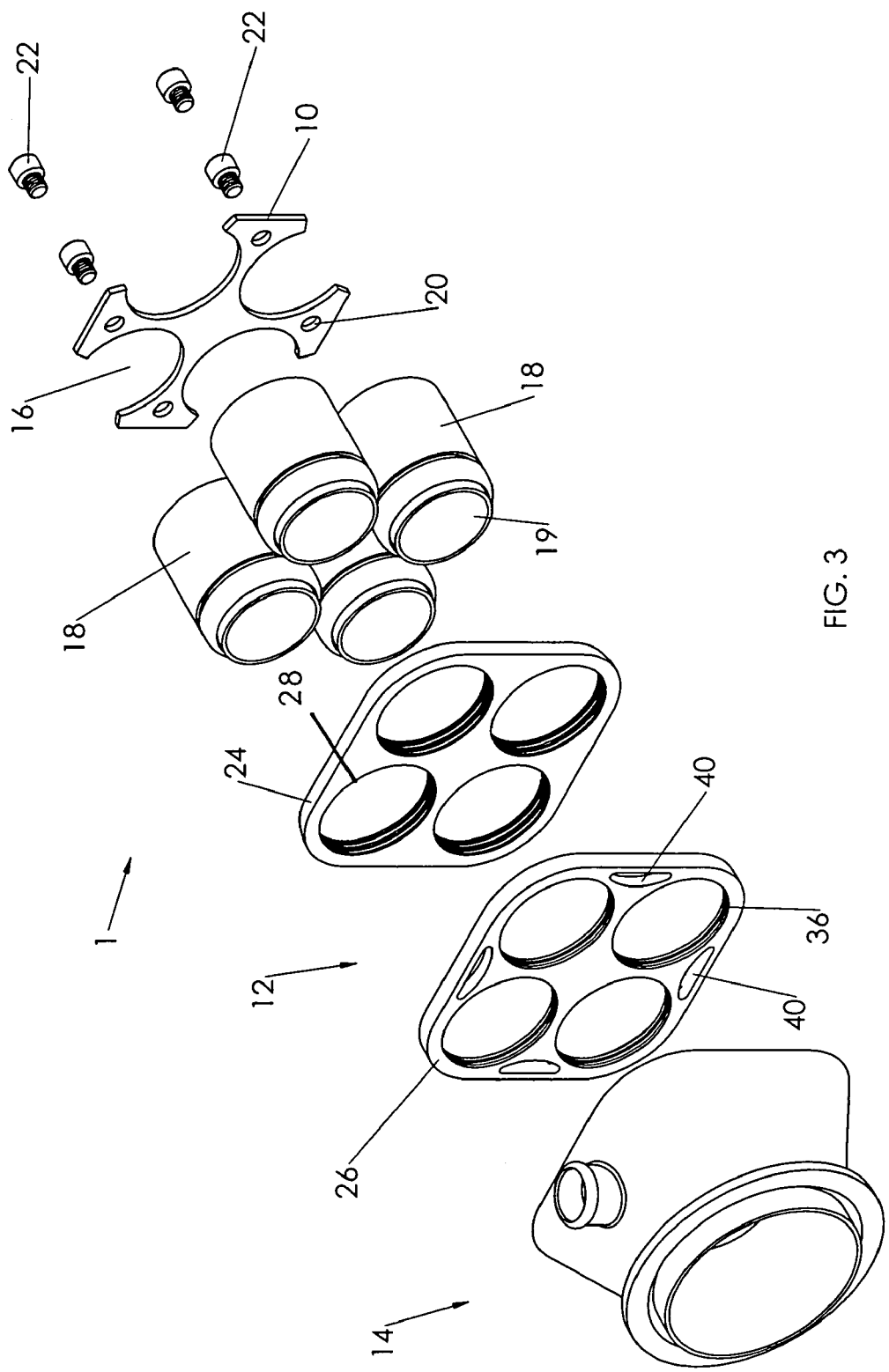
FIG. 3 is an exploded perspective view of a removable collector in accordance with the present invention.
Figure 4:
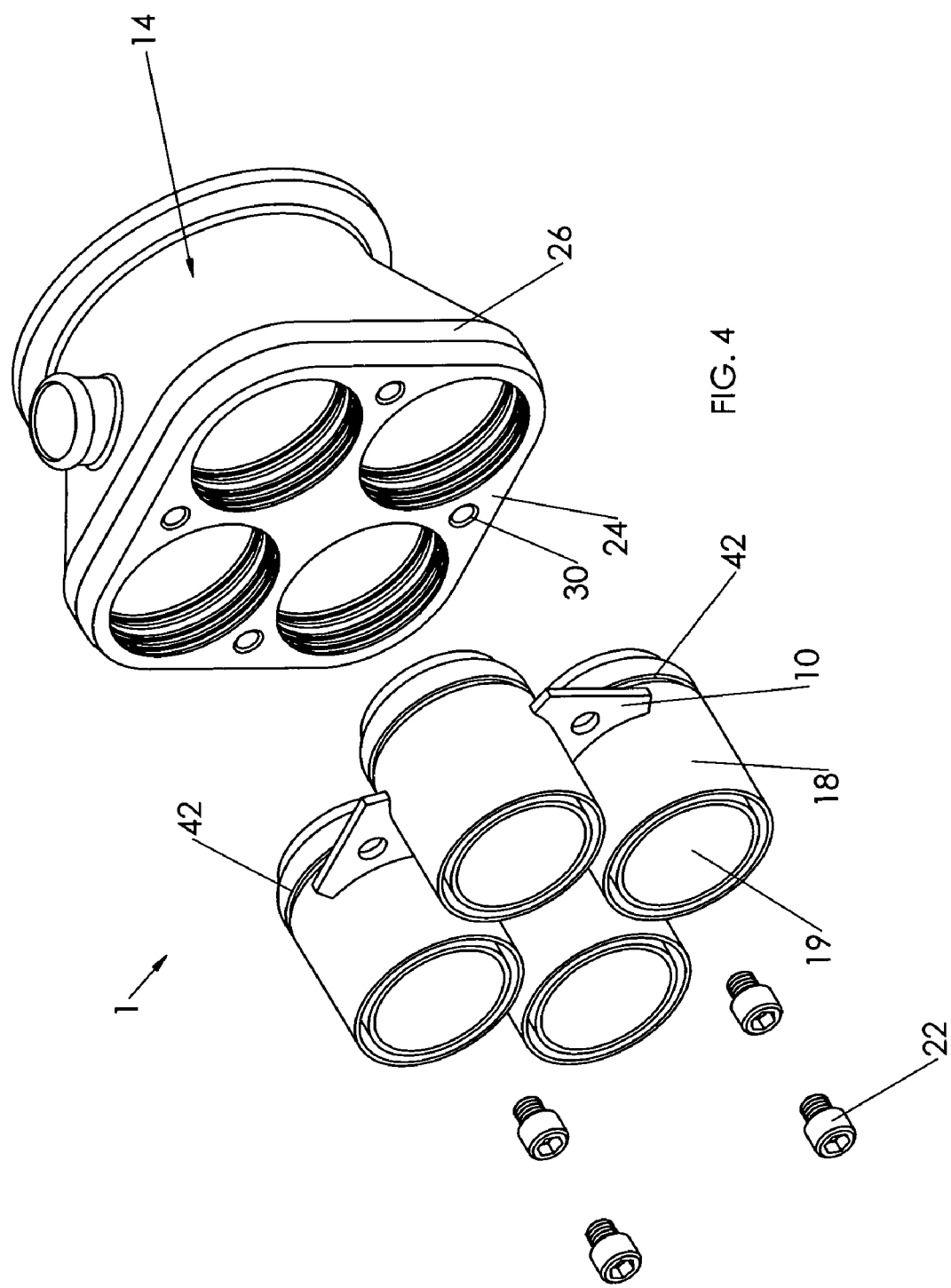
FIG. 4 is a partially exploded reverse perspective view of a removable collector in accordance with the present invention.
Figure 5:
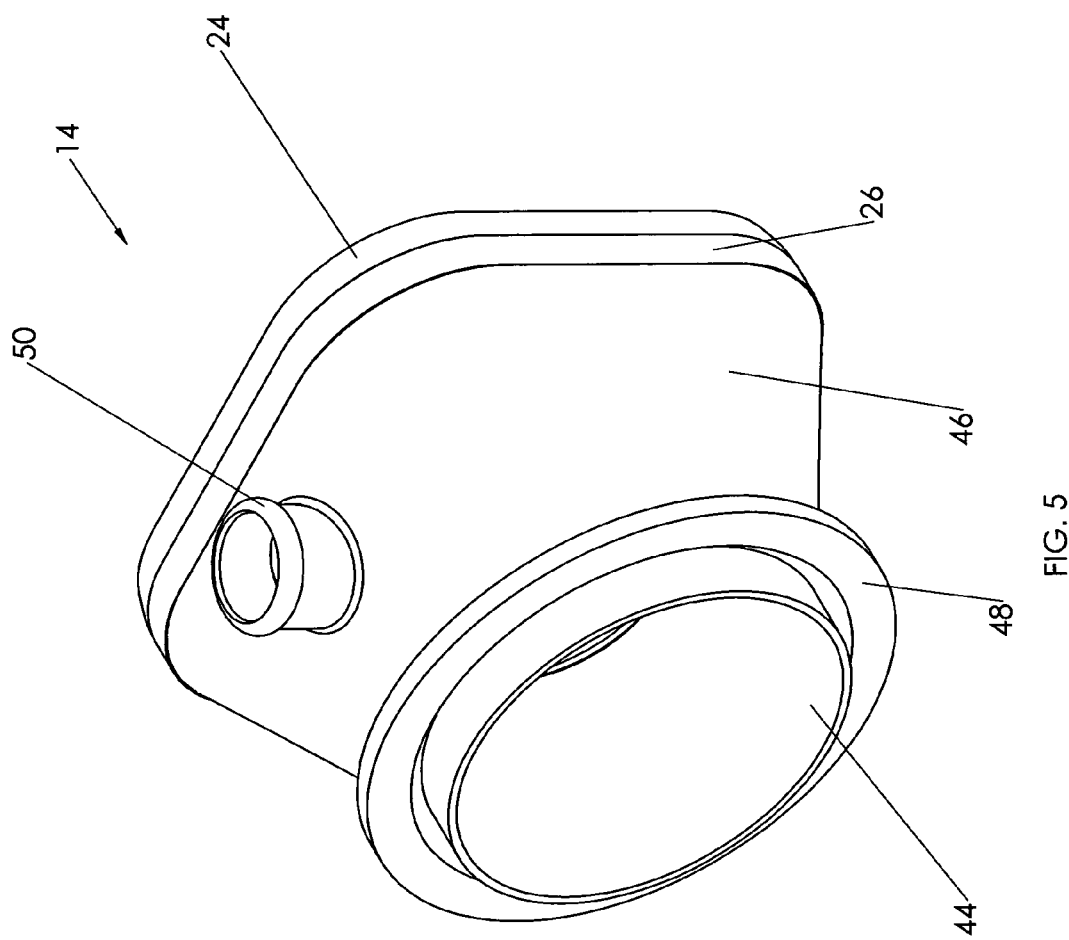
FIG. 5 is a perspective view of a removable collector in accordance with the present invention.

With reference to FIGS. 3–5, the removable collector 1 includes a retention member 10, a coolant transfer plate 12 and a collector housing 14. The retention member 10 includes at least two partially curved openings 16, which are each sized to receive a single exhaust jacket pipe 18. At least two fastener holes 20 are formed through the retention member 10; each fastener hole is preferably formed between two adjacent partially curved openings 16. Each fastener hole 20 is sized to receive a fastener 22. The retention member 10 is preferably secured to the at least two exhaust jacket pipes 18 with welding, but other attachment methods may also be used. However, other configurations of retention members may be used instead of the retention member 10.

Figure 8:
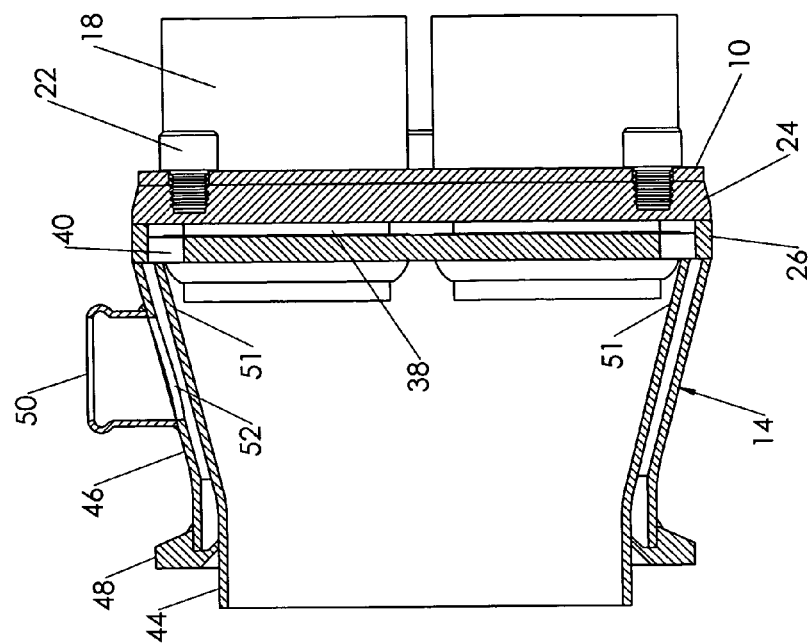
FIG. 8 is a cross sectional view of a removable collector cut through a center thereof in accordance with the present invention.
Figure 6:
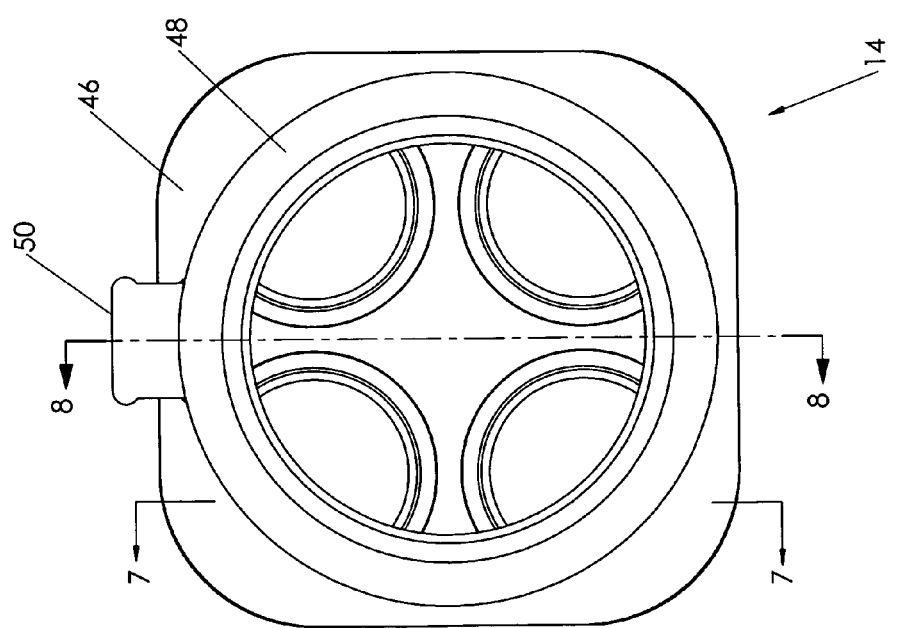
FIG. 6 is an end view of a removable collector in accordance with the present invention.
Figure 7:
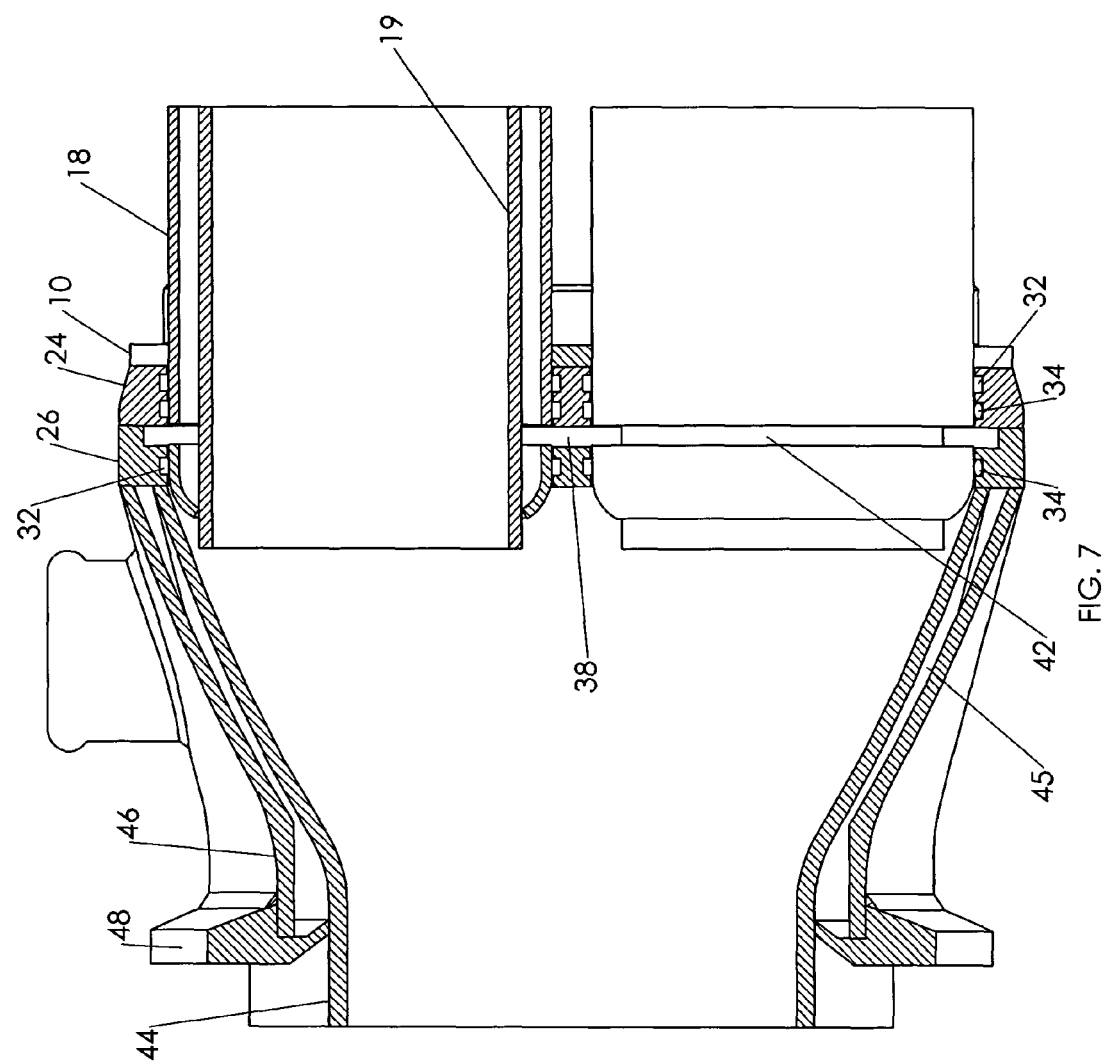
FIG. 7 is a cross sectional view of a removable collector cut through two pipes thereof in accordance with the present invention.

The coolant transfer plate 12 includes a fastener plate 24 and a coolant passage plate 26. However, the coolant transfer plate 12 could be fabricated from a single casting. At least two jacket openings 28 are formed through the fastener plate, which are each sized to receive a single exhaust jacket pipe 18. At least two tapped holes 30 are formed in the fastener plate 24 to receive the at least two fasteners 22. With reference to FIGS. 6–8, at least one sealing groove 32 is formed in each jacket opening 28. Each sealing groove 32 is sized to receive a sealing ring 34. The sealing ring 34 provides a seal between the fastener plate 24 and the outer perimeter of the exhaust jacket pipe 18.

At least two jacket openings 36 are formed through the coolant passage plate 26, which are each sized to receive at least two exhaust pipes 19. Each exhaust jacket pipe 18 is formed over an outer perimeter of a single exhaust pipe 19 at substantially an end thereof, preferably with a rolling process. The junction of an end of the exhaust jacket pipe 18 and an outer perimeter of the exhaust pipe 19 is preferably welded. However, other methods of sealing an end of the jacket pipe 18 to the exhaust pipe 19 may also be used. A coolant passage cavity 38 is formed on an inside surface of the coolant passage plate 26. At least one coolant passage opening 40 is formed through the coolant passage plate 26; each coolant passage opening 40 is formed in substantially a perimeter of the coolant passage plate 26.

At least one coolant opening 42 is formed through each exhaust jacket pipe 18, adjacent the coolant passage cavity 38. At least one sealing groove 32 is formed in each jacket opening 36. Each sealing groove 32 is sized to receive a sealing ring 34. The sealing ring 34 provides a seal between the coolant passage plate 26 and an outer perimeter of the exhaust pipe 19. The coolant passage plate 26 is attached to the fastener plate 24 on a perimeter thereof, preferably with welding. However, other attachment methods may also be used. A perimeter of the coolant passage plate 26 is attached to a perimeter of the fastener plate 24; such that the coolant passage cavity 38 is adjacent the fastener plate 24. The coolant transfer plate 12 is slipped over the at least two exhaust jacket pipes 18 and exhaust pipes 19, until thereof contacts the retention member 10. The coolant transfer plate 12 is attached to the retention member 10 with the at least two fasteners 22. However, coolant transfer plate 12 and the retention member 10 may be attached with other methods, besides the at least two fasteners 22. The retention member 10 is attached to the at least two exhaust jacket pipes 18, such that the coolant passage cavity 38 is adjacent each coolant opening 42.

The collector housing 14 preferably includes an inner collector housing 44, an outer collector housing 46, a clamping flange 48 and a coolant outlet nipple 50. However, the collector housing 14 could be fabricated from a single casting. Further, the collector housing 14 and the coolant transfer plate 12 could be fabricated from a single casting to form a collector assembly. One end of the inner collector housing 44 is preferably attached to the coolant passage plate 26 with welding or any other suitable attachment method. At least two bent passages 51 are formed in the one end of the inner collector housing 44, adjacent each coolant passage opening 40. The at least two bent passages 51 enable the flow of coolant from the coolant passage cavity 38 through the at least one coolant passage opening 40 to the area between the inner and outer collector housings. A collector coolant passage area 45 is formed between the inner and outer collector housings.

The inner collector housing 44 could also be a tail pipe. The clamping flange 48 is preferably attached to one end of the outer collector housing 46 with welding or any other suitable attachment method. The outer collector housing 46 and clamping flange 48 assembly are slipped over the other end of the inner collector housing 44, until the other end of the outer collector housing 46 contacts the coolant passage plate 26. The junction of the outer collector housing 46 and coolant passage plate 26 is preferably attached by welding, and the junction of the inner collector housing 44 and the clamping flange 48 are preferably attached by welding.

Figure 9:
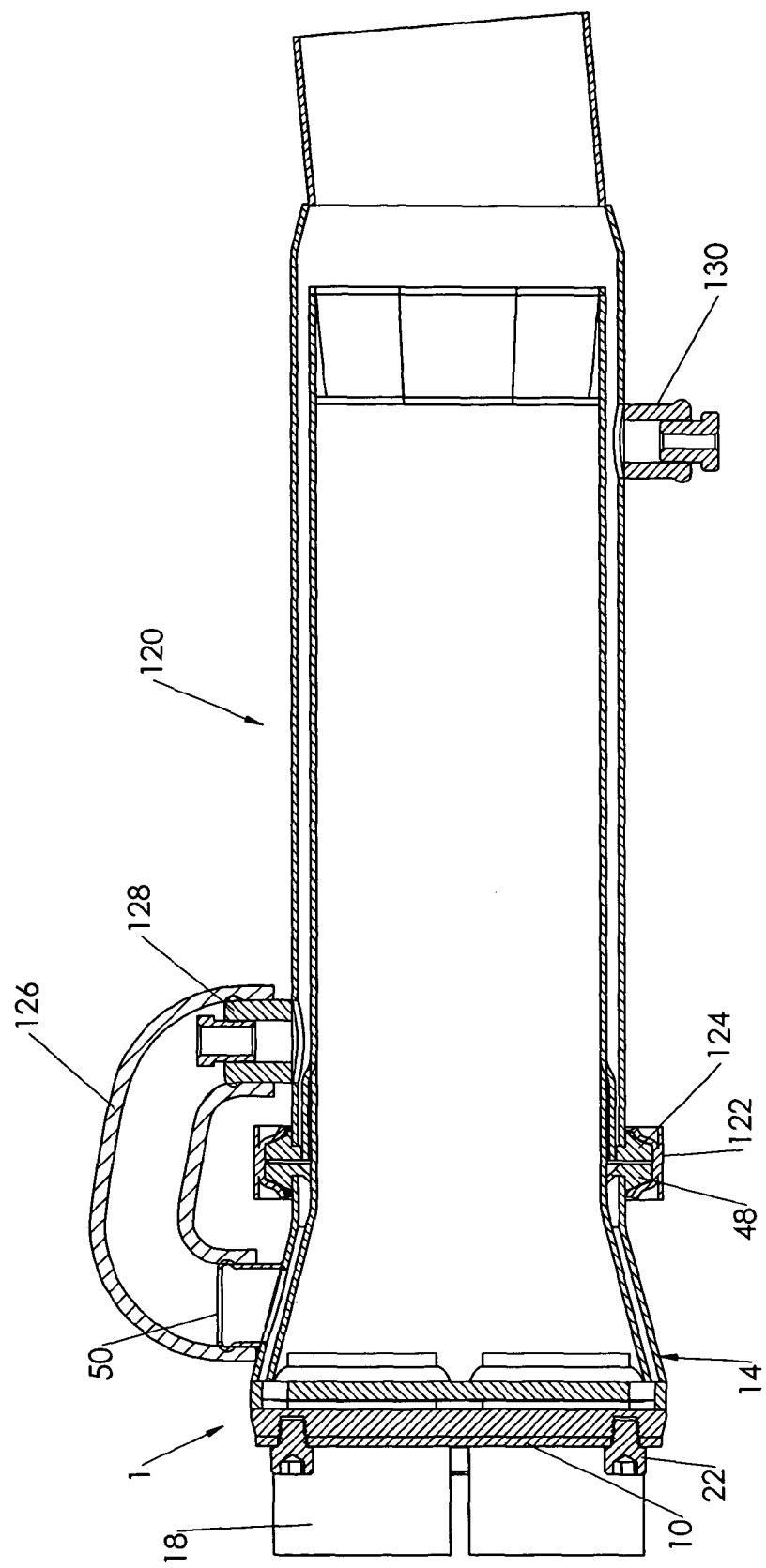
FIG. 9 is a cross sectional view of a removable collector with a tail pipe attached thereto in accordance with the present invention.

A coolant hole 52 is formed through the outer collector housing 46 and the coolant outlet nipple 50 is preferably attached to the outer collector housing 46, adjacent the coolant hole 52 with welding. With reference to FIG. 9, a tail pipe assembly 120 is attached to the removable collector 1 with a V-band clamp 122 or the like. The cross section of the V-band clamp 122 captures the clamping flange 48 on the collector housing 14 and an end flange 124 disposed on an end of the tail pipe assembly 120. One end of a coolant tube 126 is connected to the coolant outlet nipple 50 of the collector housing 14 and the other end of the coolant tube 126 is connected to an inlet tail nipple 128 of the tail pipe assembly 120.

Coolant flows between each exhaust pipe 19 and each exhaust jacket pipe 18 and exits through the coolant openings 42 into the coolant passage cavity 38. The coolant in the coolant passage cavity 38 flows through the at least one coolant passage opening 40 into an area between the inner and outer collector housings. The coolant then flows through the coolant hole 52 and through the coolant outlet nipple 50 into the coolant tube 126. The coolant exits the coolant tube 126 into the inlet tail nipple 128. The coolant flows through the tail pipe assembly 120 and exits through an end of the tail pipe assembly 120 and/or through an outlet tail nipple 130.

Figure 10:
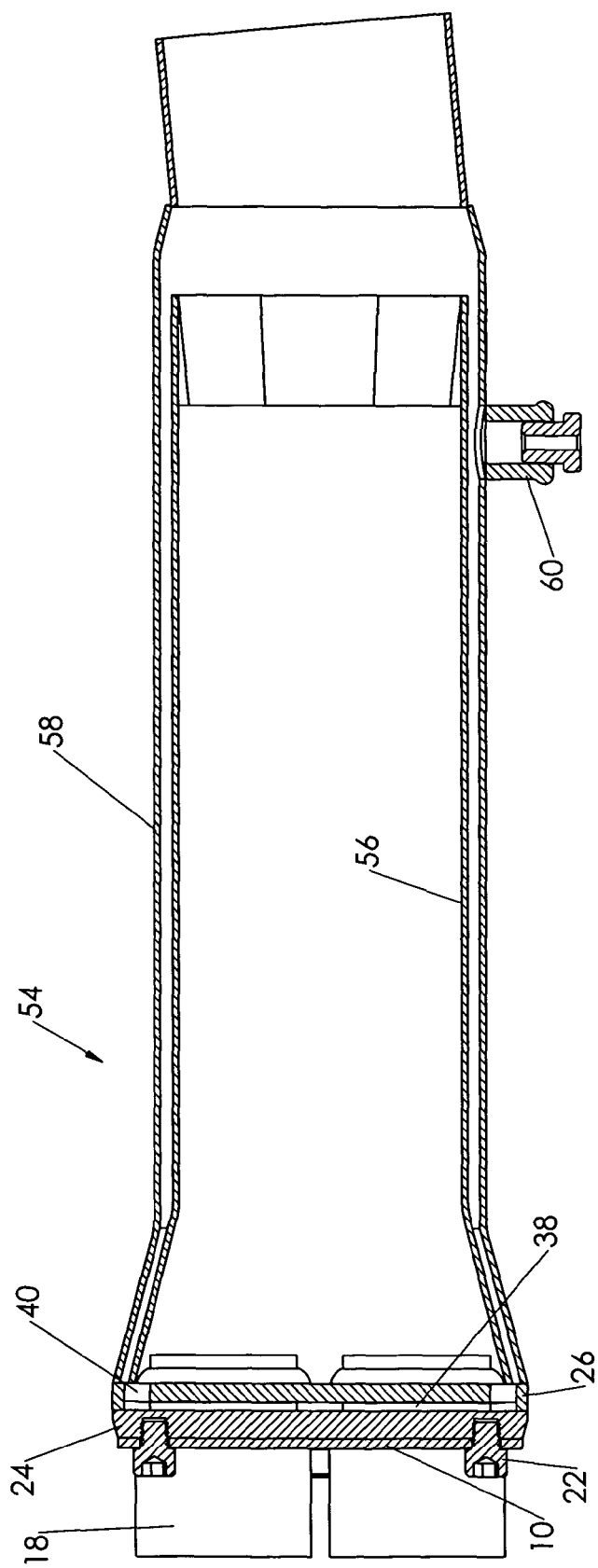
FIG. 10 is a cross sectional view of a combination removable collector/tail pipe in accordance with the present invention.

With reference to FIG. 10, a combination collector/tail pipe 54 includes an exhaust tube 56 and a jacket tube 58. One end of the exhaust tube 56 is attached to the coolant passage plate 26 with welding or any other suitable attachment method. One end of the jacket tube 58 is then attached to the coolant passage plate 26 substantially concentric with the exhaust tube 56. Coolant flows between each exhaust pipe 19 and each exhaust jacket pipe 18 and exits into the coolant passage cavity 38. The coolant in the coolant passage cavity 38 flows through the at least one coolant passage opening 40 into an area between the exhaust tube 56 and the jacket tube 58. The coolant exits through an end of the jacket tube 58 and/or through an outlet tail nipple 60.

Figure 11:
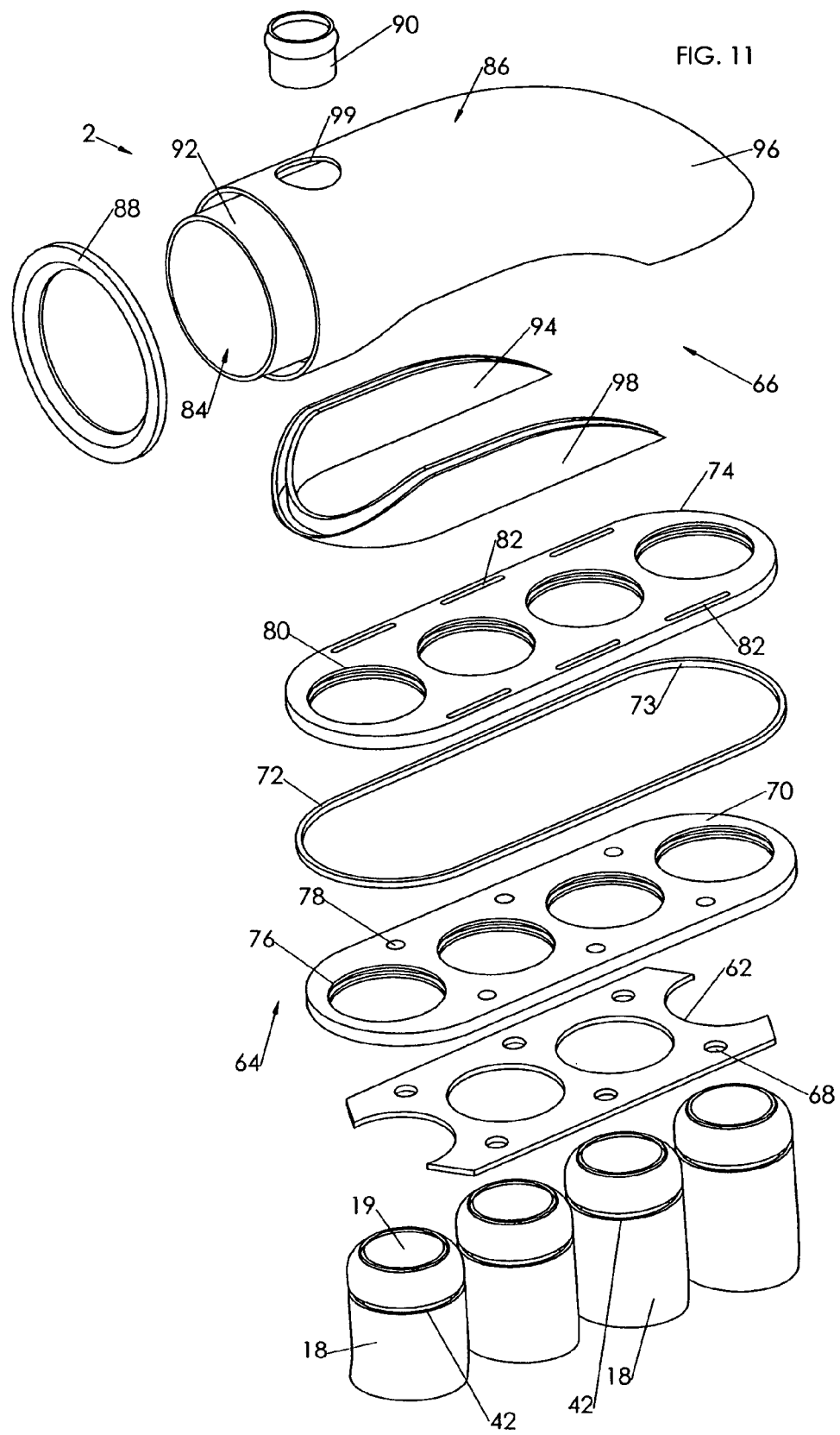
FIG. 11 is an exploded perspective view of a second embodiment of a removable collector in accordance with the present invention.
Figure 13:
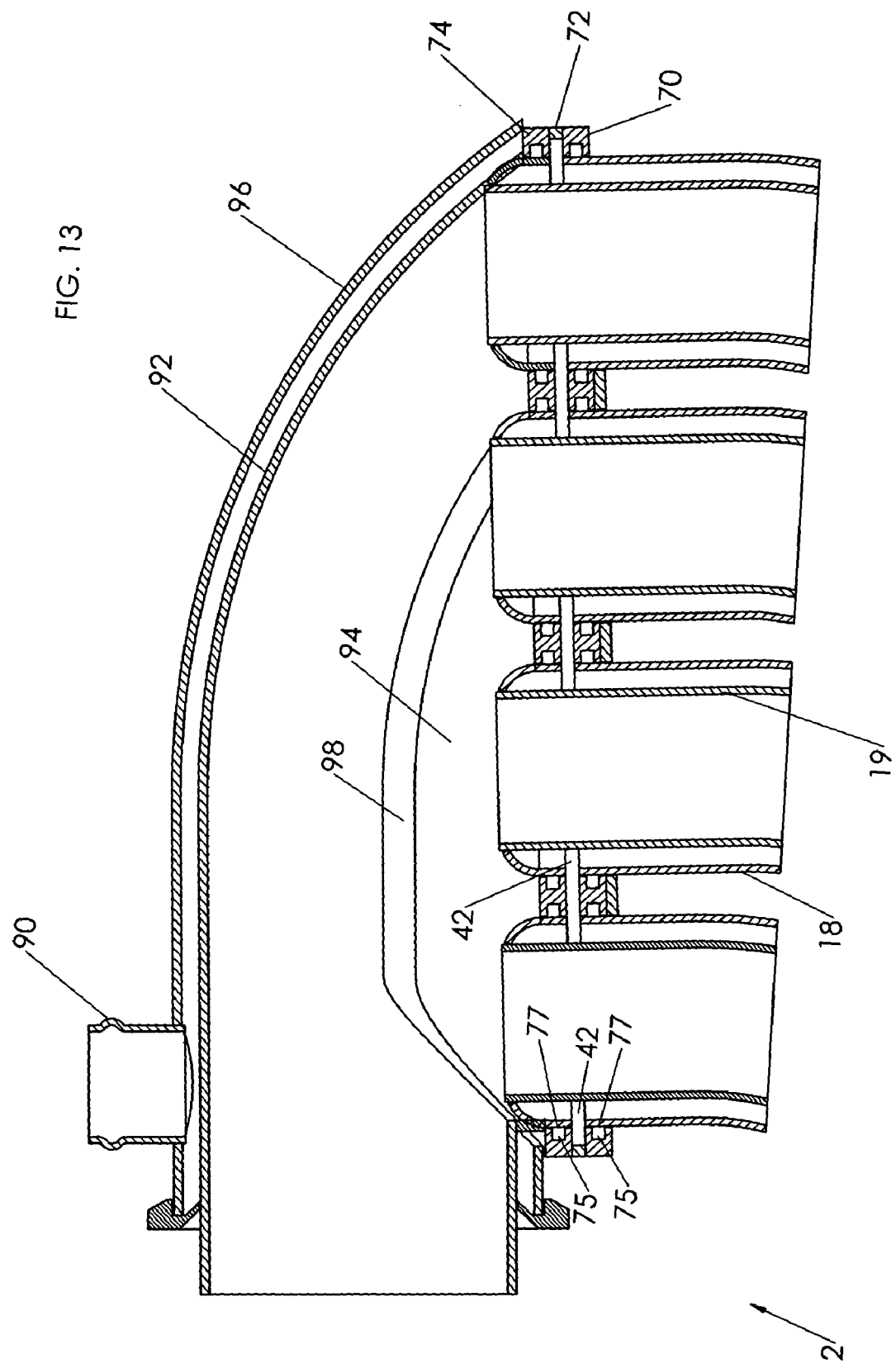
FIG. 13 is a cross sectional view of a second embodiment of a removable collector in accordance with the present invention.

With reference to FIG. 11, a second embodiment of a removable collector 2 includes a retention member 62, a coolant transfer plate 64 and a collector housing 66. The retention member 62 is attached to at least two exhaust jacket pipes 18. At least two fastener openings 68 are formed through the retention member 62 to receive at least two fasteners (not shown). The coolant transfer plate 64 includes a fastener plate 70, a spacer 72 and a coolant passage plate 74. At least two jacket holes 76 are formed through the fastener plate 70, which are each sized to receive a single exhaust jacket pipe 18. At least two tapped holes 78 are preferably formed in the fastener plate 70 to receive the at least two fasteners. With reference to FIG. 13, at least one sealing groove 75 and sealing ring 77 are used to seal the fastener plate to each exhaust jacket pipe 18.

Figure 14:
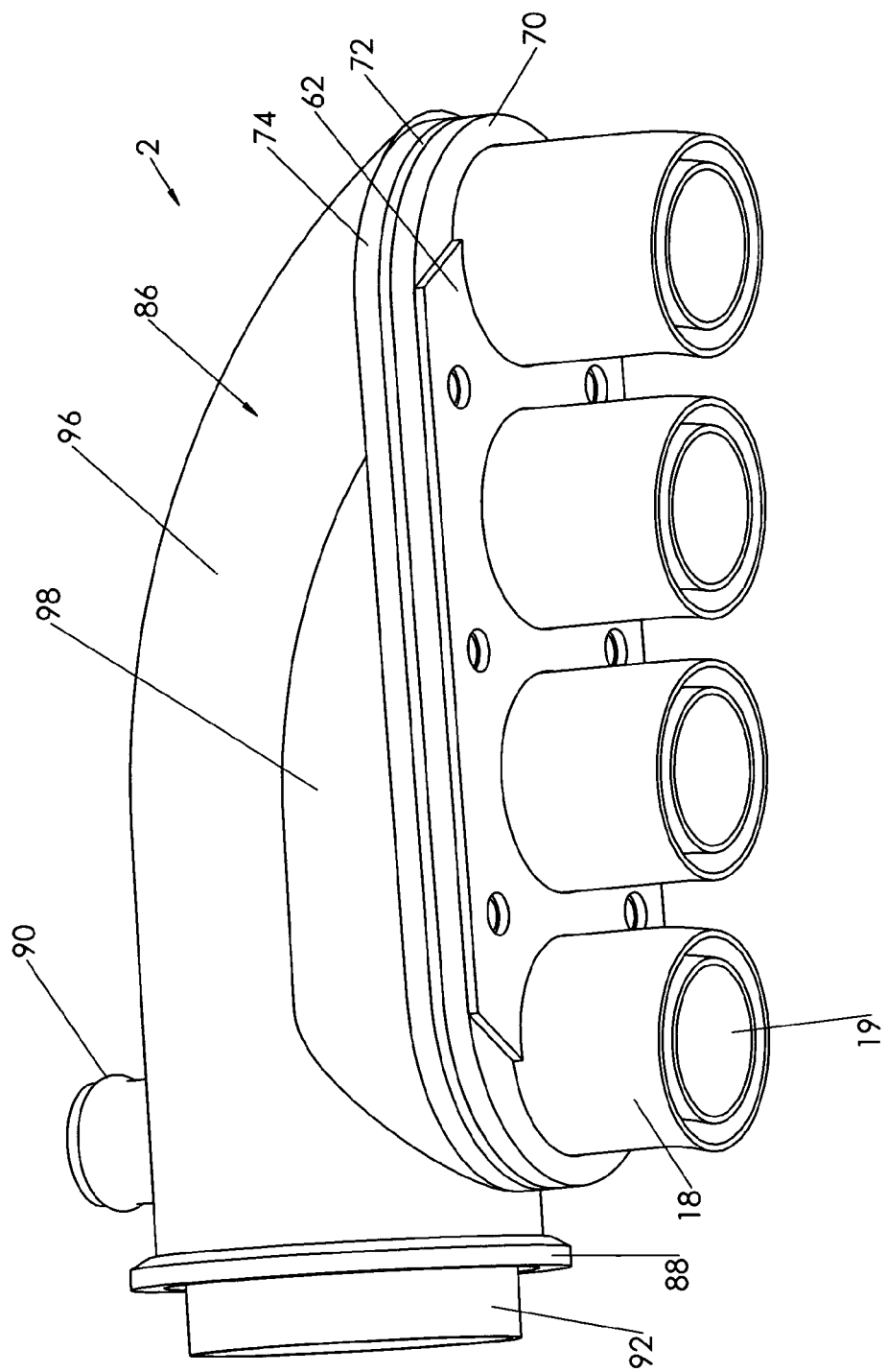
FIG. 14 is a perspective view of a second embodiment of a removable collector in accordance with the present invention.

At least two jacket holes 80 are formed through the coolant passage plate 74, which are each sized to receive a single exhaust jacket pipe 18. The at least one sealing groove 75 and sealing ring 77 are used to seal the coolant passage plate 74 to each exhaust jacket pipe 18. At least one coolant passage opening 82 is formed through the coolant passage plate 74 at substantially a perimeter thereof. The spacer 72 is retained between the fastener plate 70 and the coolant passage plate 74. With reference to FIG. 14, the perimeters of the fastener plate 70, the spacer 72 and the coolant passage plate 74 are attached to each other with any suitable process, such as welding. However, the spacer 72 could be replaced with an o-ring and the at least two tapped holes 78 formed in the coolant passage plate 74. The coolant transfer plate 64 could also be fabricated from a single casting.

Figure 12:
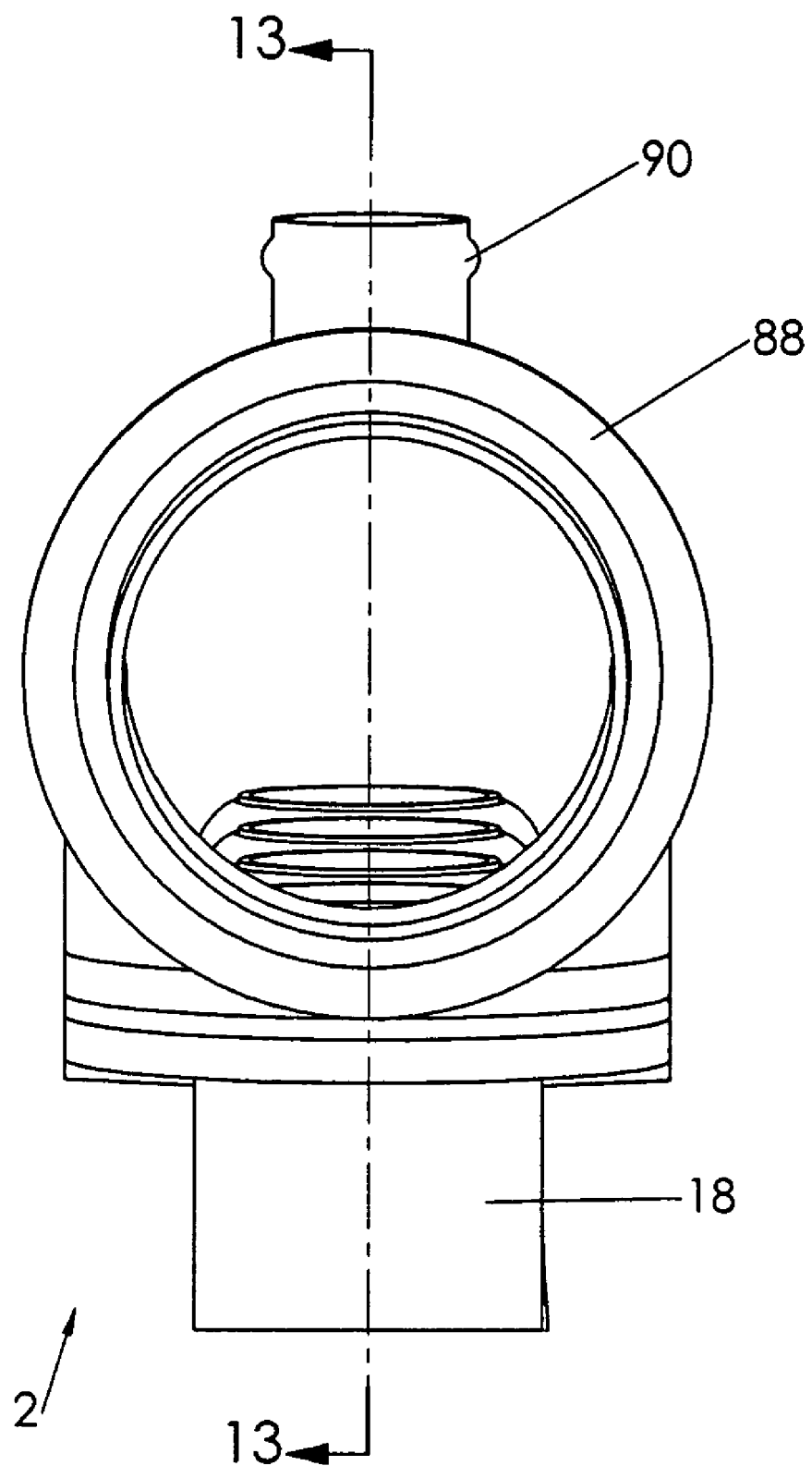
FIG. 12 is an end view of a second embodiment of a removable collector in accordance with the present invention.

An end of each exhaust jacket pipe 18 is preferably rolled over such that the opening is sized to receive a single exhaust pipe 19. However, other methods of sealing an end of the jacket pipe 18 to the exhaust pipe 19 may also be used. With reference to FIG. 12, at least one coolant opening 42 is formed through each exhaust jacket pipe 18 at substantially an end thereof. The coolant transfer plate 74 is slipped over the at least two exhaust jacket pipes 18, until thereof contacts the retention member 62. The retention member 62 is attached to the at least two exhaust jacket pipes 18, such that the inner perimeter 73 of the spacer 72 is adjacent each coolant opening 42.

The collector housing 66 includes an inner collector housing 84, an outer collector housing 86, a clamping flange 88 and a coolant outlet nipple 90. The inner collector housing 84 includes an inner collector body 92 and an inner collector flange 94. The inner collector flange 94 is attached to a perimeter of the inner collector body 92 to allow the inner collector housing 84 to make a water tight seal with the coolant passage plate 74. The outer collector housing 86 includes an outer collector body 96 and an outer collector flange 98. The outer collector flange 98 is attached to a perimeter of the outer collector body 96 to allow the outer collector housing 86 to make a water tight seal with the coolant passage plate 74.

The clamping flange 88 is attached to one end of the outer collector housing 86. The clamping flange 88 is attached to substantially the one end of the inner collector housing 84. The collector housing 66 could be formed from a single casting. Further, the inner and outer collector housings could be combined into a combination collector/tail pipe, similar to that shown in FIG. 10. The clamping flange 88 would not be used with a combination collector/tail pipe. A coolant hole 99 is formed through the outer collector housing 86 and the coolant outlet nipple 90 is attached to the outer collector housing 86, adjacent the coolant hole 99.

Coolant flows between each exhaust pipe 19 and exhaust jacket pipe 18 and exits through the coolant openings 42 into the inner perimeter 73 of the spacer 72. The coolant in the inner perimeter 73 of the spacer 72 flows through the at least one coolant passage opening 82 into an area between the inner and outer collector housings and out through the coolant outlet nipple 90.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A method of removably attaching a collector housing to an end of a header, comprising the steps of:
   forming at least two coolant openings through at least two exhaust jacket pipes of said header;
   providing a collector assembly having at least two jacket openings that are sized to receive said at least two exhaust jacket pipes, at least one sealing ring being disposed between an outer perimeter of at least one of said at least two exhaust jacket pipes and at least one of said at least two jacket openings, wherein said at least two jacket openings having a sealing groove sized to receive said at least one sealing ring, said collector assembly having a collector coolant passage area, attaching removably said collector housing to said at least two exhaust jacket pipes;
   flowing a coolant through said at least two coolant openings into said collector coolant passage area.

2. The method of removable attaching a collector housing to an end of a header of claim 1, further comprising the step of:
   providing a collector assembly with a collector housing and a coolant transfer plate.

3. The method of removably attaching a collector housing to an end of a header of claim 2, further comprising the step of:
   providing said collector housing with an inner collector housing and an outer collector housing, attaching said inner and outer collector housings to said coolant transfer plate.

4. The method of removably attaching a collector housing to an end of a header of claim 2, further comprising the step of:
   attaching a retention member to an end of said at least two exhaust jacket pipes, said coolant transfer plate being removably retained by said retention member.

5. The method of removably attaching a collector housing to an end of a header of claim 2, further comprising the step of:
   providing said coolant transfer plate with a fastener plate and a coolant passage plate, forming a coolant passage cavity in said coolant passage plate, forming at least one coolant passage opening through said coolant passage plate.

6. The method of removably attaching a collector housing to an end of a header of claim 5, further comprising the step of:
   aligning said at least two coolant openings with said coolant passage cavity.

7. The method of removably attaching a collector housing to an end of a header of claim 5, further comprising the step of:
   attaching a perimeter of said coolant passage plate to a perimeter of said fastener plate, such that said coolant passage cavity is adjacent said fastener plate.

8. The method of removably attaching a collector housing to an end of a header of claim 5, further comprising the step of:
   securing said fastener plate to said retention member with at least two fasteners.

9. The method of removably attaching a collector housing to an end of a header of claim 5, further comprising the step of:
   sealing a perimeter of said at least two exhaust jacket pipes to at least two jacket openings in said fastener plate, sealing a perimeter of at least two exhaust pipes to at least two pipe openings in said coolant passage plate.

10. The method of removably attaching a collector housing to an end of a header of claim 9, further comprising the step of:
    sealing an end of each one of said at least two exhaust jacket pipes to a perimeter of a single said exhaust pipe.

11. A method of removably attaching a collector housing to an end of a header, comprising the steps of:
    forming at least two coolant openings through at least two exhaust jacket pipes of said header;
    providing a coolant transfer plate having at least two jacket openings that are sized to receive said at least two exhaust jacket pipes, at least one sealing ring being disposed between an outer perimeter of at least one of said at least two exhaust jacket pipes and at least one of said at least two jacket openings, wherein said at least two jacket openings having a sealing groove sized to receive said at least one sealing ring;
    attaching removably said collector housing to said at least two exhaust jacket pipes;
    providing a collector housing having a collector coolant passage area, attaching said collector housing to said coolant transfer plate; and
    flowing a coolant through said at least two coolant openings of said coolant transfer plate into said collector coolant passage area.

12. The method of removably attaching a collector housing to an end of a header of claim 11, further comprising the step of:
    attaching a retention member to an end of said at least two exhaust jacket pipes, said coolant transfer plate being removably retained by said retention member.

13. The method of removably attaching a collector housing to an end of a header of claim 11, further comprising the step of:
    providing a collector housing having an inner collector housing and an outer collector housing, attaching said inner and outer collector housings to said coolant transfer plate to form said collector coolant passage area.

14. The method of removably attaching a collector housing to an end of a header of claim 11, further comprising the step of:

providing said coolant transfer plate with a fastener plate and a coolant passage plate, forming a coolant passage cavity in said coolant passage plate, forming at least one coolant passage opening through said coolant passage plate.

15. The method of removably attaching a collector housing to an end of a header of claim 14, further comprising the step of:
aligning said at least two coolant openings with said coolant passage cavity.

16. The method of removably attaching a collector housing to an end of a header of claim 14, further comprising the step of:
attaching a perimeter of said coolant passage plate to a perimeter of said fastener plate, such that said coolant passage cavity is adjacent said fastener plate.

17. The method of removably attaching a collector housing to an end of a header of claim 14, further comprising the step of:
securing said fastener plate to said retention member with at least two fasteners.

18. The method of removably attaching a collector housing to an end of a header of claim 14, further comprising the step of:
sealing a perimeter of said at least two exhaust jacket pipes to at least two jacket openings in said fastener plate, sealing a perimeter of at least two exhaust jacket pipes to at least two jacket openings in said coolant passage plate.

19. The method of removably attaching a collector housing to an end of a header of claim 18, further comprising the step of:
sealing an end of each one of said at least two exhaust jacket pipes to a perimeter of a single said exhaust pipe.

20. A method of removably attaching a collector housing to an end of a header, comprising the steps of:
sealing an end of one of at least two exhaust jacket pipes of said header to a perimeter of a single exhaust pipe;
forming at least two coolant openings through said at least two exhaust jacket pipes;
providing a collector assembly having at least two jacket openings that are sized to receive said at least two exhaust jacket pipes, at least one sealing ring being disposed between an outer perimeter of at least one of said at least two exhaust jacket pipes and at least one of said at least two jacket openings, wherein said at least two jacket openings having a sealing groove sized to receive said at least one sealing ring, said collector housing having a collector coolant passage area, attaching removably said collector housing to said at least two exhaust jacket pipes;
flowing a coolant through said at least two coolant openings into said collector coolant passage area.

21. The method of removably attaching a collector housing to an end of a header of claim 20, further comprising the step of:
providing a collector assembly with a collector housing and a coolant transfer plate.

22. The method of removably attaching a collector housing to an end of a header of claim 21, further comprising the step of:
providing said collector housing with an inner collector housing and an outer collector housing, attaching said inner and outer collector housings to said coolant transfer plate.

23. The method of removably attaching a collector housing to an end of a header of claim 21, further comprising the step of:
attaching a retention member to an end of said at least two exhaust jacket pipes, said coolant transfer plate being removably retained by said retention member.

24. The method of removably attaching a collector housing to an end of a header of claim 21, further comprising the step of:
providing said coolant transfer plate with a fastener plate and a coolant passage plate, forming a coolant passage cavity in said coolant passage plate, forming at least one coolant passage opening through said coolant passage plate.

25. The method of removably attaching a collector housing to an end of a header of claim 24, further comprising the step of:
aligning said at least two coolant openings with said coolant passage cavity.

26. The method of removably attaching a collector housing to an end of a header of claim 24, further comprising the step of:
attaching a perimeter of said coolant passage plate to a perimeter of said fastener plate, such that said coolant passage cavity is adjacent said fastener plate.

27. The method of removably attaching a collector housing to an end of a header of claim 24, further comprising the step of:
securing said fastener plate to said retention member with at least two fasteners.

28. The method of removably attaching a collector housing to an end of a header of claim 24, further comprising the step of:
sealing a perimeter of said at least two exhaust jacket pipes to at least two jacket openings in said fastener plate, sealing a perimeter of at least two exhaust jacket pipes to at least two jacket openings in said coolant passage plate.

\* \* \* \* \*